United States Patent [19]

Kulprathipanja et al.

[11] Patent Number: 4,751,104
[45] Date of Patent: Jun. 14, 1988

[54] PREPARATION OF GAS SELECTIVE MEMBRANES

[75] Inventors: Santi Kulprathipanja; Sudhir S. Kulkarni, both of Hoffman Estates; Edward W. Funk, Highland Park, all of Ill.

[73] Assignee: UOP Inc., Des Plaines, Ill.

[21] Appl. No.: 678,745

[22] Filed: Dec. 6, 1984

[51] Int. Cl.$^4$ .......................... B05D 3/12; B05D 5/00
[52] U.S. Cl. ................... 427/57; 210/500.3; 210/500.41; 427/244; 427/245; 427/296; 427/322; 427/347
[58] Field of Search ............ 427/244, 245, 57, 387, 427/296, 322, 393.5; 210/500.2

[56] References Cited

U.S. PATENT DOCUMENTS

| | | | |
|---|---|---|---|
| 2,664,366 | 12/1953 | Wilson | 427/244 |
| 2,673,825 | 3/1954 | Biefeld et al. | 264/41 |
| 3,260,618 | 7/1966 | Stark | 427/244 |
| 3,532,527 | 10/1970 | Skiens | 106/176 |
| 3,661,630 | 5/1972 | Kunststofftechniker | 427/244 |
| 4,210,697 | 7/1980 | Adiletta | 427/244 |
| 4,230,463 | 10/1980 | Henis et al. | 55/16 |
| 4,243,701 | 1/1981 | Riley et al. | 427/244 |
| 4,413,074 | 11/1983 | Wrasidlo et al. | 427/244 |
| 4,454,085 | 6/1984 | Schindler et al. | 264/41 |
| 4,519,909 | 5/1985 | Castro | 210/500.2 |

*Primary Examiner*—Janyce A. Bell
*Attorney, Agent, or Firm*—Thomas K. McBride; John F. Spears, Jr.; Raymond H. Nelson

[57] ABSTRACT

Gas separation membranes which possess improved characteristics as exemplified by selectivity and flux may be prepared by coating a porous organic polymer support with a solution or emulsion of a plasticizer and an organic polymer, said coating being effected at subatmospheric pressures in order to increase the penetration depth of the coating material.

13 Claims, No Drawings

PREPARATION OF GAS SELECTIVE MEMBRANES

The Government of the United States of America has rights in this invention pursuant to Contract No. DE-AC07-82ID12422 awarded by the U.S. Department of Energy.

BACKGROUND OF THE INVENTION

In recent years, the separation of components or mixtures either in liquid or gaseous form has attracted a great deal of interest. For example, reverse osmosis may be used in the purification of water, especially saline water. When utilizing reverse osmosis in the purification of saline water, a pressure in excess of the osmotic pressure of the saline water feed solution is applied to the solution which is separated from purification water by a semipermeable membrane. Pure water thereby diffuses through the membrane while the sodium chloride molecules or other impurities which may be present in the water are retained by the membrane. Likewise, brackish water which contains impurities other than or in addition to sodium chloride may also be subjected to a reverse osmosis process utilizing similar semipermeable membranes. The specific types of semipermeable membranes which are employed may be fabricated from cellulose acetate, polyamides, polyimides, polyphenyl esters, polysulfonamides, polybenzoimidazole, polyarylein oxides as well as other polymeric organic material.

It is taught in U.S. Pat. No. 4,243,701 to Riley et al. that certain membranes may also be utilized for the separation of various gases. The separation of a gas mixture utilizing a membrane is effected by passing a feed stream of the gas across the surface of the membrane. Inasmuch as the feed stream is at an elevated pressure relative to the effluent stream, a more permeable component of the mixture will pass through the membrane at a more rapid rate than will a less permeable component. Therefore, the permeate stream which passes through the membrane is enriched in the more permeable component while, conversely, the residue stream is enriched in the less permeable component of the feed. U.S. Pat. No. 4,230,463 discloses a multicomponent membrane which is useful for separating gases. The membrane comprises a polymer coating on a porous separation membrane, in which the latter membrane may itself also be a polymer such as a polysulfone. It is to be noted from this patent that the polysulfone which was employed is not unduly porous and has a narrow range of ratios of total surface area to total pore cross-sectional area. In particular, the patent discloses the use of membranes having ratios of total surface area to total pore cross-sectional area of about 1000:1. This type of membrane is considered a tight membrane having relatively small diameter pores which is in contrast to the polymer support of the present invention which possesses a total surface area to total pore cross-sectional area in a range of from about 5:1 to about 800:1. While the type of membrane set forth in the patent may be conducive to high separation factors, the rate of passage of fluid through the membrane which is the flux is restricted.

As will hereinafter be shown in greater detail, it has now been discovered that membranes which are relatively loose, i.e., membranes having relatively large pores may, after treatment thereof, be utilized in a gas separation process in an economical manner.

SUMMARY OF THE INVENTION

This invention relates to a process for the preparation of gas separation membranes. More specifically, the invention relates to a process in which a gas separation membrane is treated in a manner prior to use thereof whereby the membrane will possess the desirable characteristics of high selectivity and relatively high flux.

As was previously discussed, membranes which are used for the separation of various components of gaseous mixtures must possess certain characteristics in order that the separation of the gases may be effected in an economical manner. The desirable characteristics which must be possessed by the membranes include the ability to effect a separation with high selectivity of one or more gases from other gases as well as permitting the separation to be effected at a relatively high flux. Many of the membranes which have heretofore been utilized for this separation process possess either a high selectivity or a high flux. It has now been discovered that by treating a porous support membrane in a manner hereinbefore set forth in greater detail, it is possible to obtain a membrane which possesses both of the aforesaid desirable characteristics. The thus prepared membrane may be utilized for the separation of various gases whereby one stream may be enriched for use in definite processes. For example, the membrane may be employed for the separation of carbon dioxide from methane, this particular combination of gases being found in natural gas or landfill gas. In addition, by utilizing such a membrane, it is possible to effect a separation of these gases which occur when employing a process for the enhanced recovery of oil from subterranean reservoirs of said oil. One method of effecting the enhanced recovery of oil is to pump carbon dioxide into the well, thus forcing the oil from the subterranean reservoir to the surface for recovery. However, the carbon dioxide which is used to pump the oil from the reservoir will become mixed with methane gas which is normally present in the oil. In order to operate this enhanced oil recovery process in an economical manner, it is necessary to reuse the carbon dioxide. By employing the membrane of the present invention, it is possible to separate the carbon dioxide from the methane, thereby rendering the carbon dioxide fit for reuse in pumping the gas into the well.

It is therefore an object of this invention to provide a process for the preparation of a useable gas separation membrane. A further object of this invention is to treat a gas separation membrane prior to use thereof to impart more desirable characteristics to said membrane.

In one aspect of embodiment of this invention resides in a process for the preparation of a gas selective membrane which comprises the steps of providing a porous supporting membrane comprised of a first organic polymer having opposing first and second surfaces, providing an emulsion or solution of a second polymer dissolved in a suitable solvent and a plasticizer for said first and second organic polymers present in an amount ranging from about 10 wt% to about 50 wt%, coating the porous supporting membrane with the emulsion or solution by application of the emulsion or solution to the first surface of the membrane, the opposing second surface of the membrane being under reduced pressure in comparison to the pressure applied to the first surface to enhance the penetration of the emulsion or solution into the membrane upon contact with the first surface, curing the resultant coated supporting membrane at an elevated temperature for a period of time sufficient to evaporate substantially all of said solvent, and recovering the thus-produced cured gas selective membrane.

A specific embodiment of this invention is found in a process for the preparation of a gas selective membrane which comprises forming an emulsion of a glycol having a molecular weight of from about 200 to about 600 and silicone rubber dissolved in a fluorinated hydrocarbon which is liquid at ambient temperature and pressure, coating a porous support comprising polysulfone with said solution in the range of from about 1 to about 25 mm of mercury for a period of time in the range of from about 10 seconds to about 5 minutes, curing the resultant membrane at an elevated temperature for a period of time sufficient to evaporate substantially all of said fluorinated hydrocarbon and recovering the gas selective membrane, with the surface of the membrane opposite the surface being coated being under reduced pressure in comparison to the pressure applied to the surface being coated.

Other objects and embodiments may be found in the following further detailed description of the present invention.

DETAILED DESCRIPTION OF THE INVENTION

As hereinbefore set forth, the present invention is concerned with a process for preparing gas selective membranes which possess the desirable characteristics of effecting the separation of gases in an efficient manner due to the high selectivity and high flux of the membrane. As is well known in the art of membrane separation technology, the different components of a mixture which is either fluid or gaseous in nature are passed through a properly selected membrane at different rates. These different rates result from different diffusivity and solubility characteristics which may be collectively referred to as "permeability" of each component which is passing through the membrane. The separation factor or selectivity will, of course differ in each membrane, the higher the selectivity, the better the separation that will be achieved.

In this respect, a membrane which contains a multiplicity of components can be utilized for the separation of gases. The separation will be effected with a high selectivity and a relatively high flux due to the marked differences in the respective permeabilities of the components of the gaseous mixture through a multicomponent membrane. The multicomponent membrane which may be utilized to effect this separation of gases from a mixture thereof comprises a porous organic polymer support which has been treated with a coating material comprising a mixture of a plasticizer and an organic polymer. As will hereinafter be shown in greater detail, it has now been discovered that the depth of the coating material which is incorporated into the pores of the porous organic support is a critical parameter in determining the effective performance of the membrane.

The plasticizer which comprises one component of the coating material may be any material which is included in the commonly understood meaning of that term, i.e., a chemical which will impart flexibility, workability or stretchability to the polymer which comprises the second component of the coating composition as well as the porous organic polymer support. The plasticizer which is employed would most likely comprise a liquid which possesses a high boiling point and a low partial pressure dispersed uniformly as an emulsion in the organic polymer of the coating material, or in homogeneous phase as a solution with the organic polymer. The selection of specific ingredients for the multicomponent membrane will depend on the feed mixture from which the components or gases are to be separated. For example, the feed mixture may comprise a mixture of gases such as carbon dioxide/methane, oxygen/nitrogen, etc. A particular plasticizer which may be employed when separating these gases comprises a glycol having a molecular weight in the range of from about 200 to about 600. In the preferred embodiment of the invention the plasticizer will be present in the coating process in a weight ratio in the range from about 5 wt.% to about 50 wt.% of the coating composition, and most preferably, from about 10 wt% to about 50 wt% of the coating composition.

The porous organic polymer support which is coated with the coating composition will comprise, in the preferred embodiment of the invention, polysulfone or cellulose acetate, the former possessing a ratio of total surface area to total pore cross-sectional area in a range of from about 5:1 to about 800:1. The aforementioned range of total surface area to total pore cross-sectional area indicates that inasmuch as the ratio is relatively low in nature, the polysulfone may be designated as a "loose" polymer which contains a large number of pores having a relatively large diameter.

The coating material comprising a mixture of a plasticizer and an organic polymer of the type hereinbefore set forth possesses the capability of not only altering the permeability of the organic polymer with which it is mixed, but also acting upon the porous organic polymer support material by softening the same and causing the pores to shrink while at the same time facilitating the plugging of the pores with the polymer in admixture with the plasticizer. As was previously discussed, an emulsion or solution of the plasticizer with the organic polymer is formed. If so desired, the organic polymer may be dissolved in a suitable solvent, an example of said solvent, particularly when the organic polymer comprises silicone rubber, comprises a fluorinated hydrocarbon known in the trade as Freon which is liquid at standard temperature and pressure, a specific example of such Freon being trifluorotrichloroethane. The concentration of the organic polymer in the solvent is preferably in a range of from about 0.5 wt.% to about 50 wt.% of the solution. The plasticizer and the organic polymer are as a result preferably present in the emulsion or solution in a weight ratio in the range of from about 0.05:1 to about 1:1 wt% of plasticizer per wt% of polymer. In order to minimize the formation of pin holes or voids in the multicomponent membrane, the emulsion or solution which is formed is preferably degassed prior to coating the porous organic polymer support material by ultrasonic means.

The process of the present invention for preparing a gas separation membrane which possesses improved characteristics is effected by increasing the penetration depth of the coating solution or emulsion containing a plasticizer and an organic polymer as the components thereof. This increase in penetration depth is effected by coating the porous organic polymer support with a solution of the plasticizer and organic polymer dissolved in a suitable solvent under subatmospheric pressure conditions. The subatmospheric pressure conditions which are employed to effect the desired penetration will include a pressure in the range of from about 1 to about 25 mm of mercury for a period of time which may range from about 10 seconds up to about 5 minutes. The subatmospheric pressure is provided for by employing vacuum means which are positioned under the porous organic polymer support to attract the coating material to a position which is deeper into the pores of the support than would be possible when only coating or casting the solution on the upper surface of the support material.

After subjecting the porous support material to the coating action under a vacuum within the range hereinbefore set forth, the coated support is then subjected to a curing action at an elevated temperature which may range from about 30° to about 150° C. for a period of time within the range of from about 10 minutes to about 1.5 hours, said curing period being for a time sufficient to evaporate substantially all of the solvent which was employed to form the plasticizer-organic polymer solution. Following this, the desired gas-selective membrane may then be recovered for use.

The following examples are given for purposes of illustrating the process of the present invention as well as to the improved results which are obtained when utilizing membranes prepared according to said process. However, it is to be understood that these examples are merely illustrative in nature and that the present process is not necessarily limited thereto.

EXAMPLE I

A solution was formed by admixing 1.2 grams of silicone rubber with 0.3 gram of polyethylene glycol having a molecular weight of 400 and 18.5 grams of trichlorotrifluoroethane. The solution was degassed by ultrasonic means before utilizing the solution to coat a highly porous sulfone membrane. A polysulfone membrane having a ratio of total surface area to total pore cross-sectional area of about 5:1 was placed on the top surface of a vacuum plate. Vacuum having a pressure of from about 10 to about 25 mm of mercury was applied to the plate. The aforementioned solution was poured on top of the polysulfone and thereafter a casting knife was passed over the solution to provide a thickness of about 3 mil. After maintaining the vacuum for a period of 1 minute, the coated membrane was cured at a temperature of 82° C. for a period of 30 minutes.

EXAMPLE II

In this example, a polysulfone which was not as porous as the polysulfone utilized in Example I, which had a ratio of total surface area to total pore cross-sectional area of 30:1, was treated with a solution of silicone rubber dissolved in a fluorinated hydrocarbon solvent known in the trade as Freon TF, the silicone rubber being in a 5% to 7% concentration in the solvent. Coating of the polysulfone was effected without the use of any vacuum.

A second polysulfone support which was similar in nature to that utilized in Example I above, that is, having a total surface area to total pore cross-sectional area of 5:1, was also coated with a silicone rubber at atmospheric pressure. The two coated polysulfone membranes were then cured at a temperature of 82° C. for a period of 30 minutes. The first polysulfone membrane was labeled "A" and the second polysulfone membrane, having a more porous structure, was labeled "B."

EXAMPLE III

In this example, the polysulfone support which had a 30:1 ratio was again treated with a solution of polyethylene glycol and silicone rubber dissolved in fluorinated hydrocarbon solvent. One solution contained 30% of polyethylene glycol with respect to the silicone rubber and the other solution contained 40% of polyethylene glycol with respect to the silicone rubber. The coating of the support with the polyethylene glycol/silicone solution was effected at atmospheric pressure, no vacuum being applied to the polysulfone support.

In like manner, the more porous polysulfone support having a 5:1 ratio of total surface area to total pore cross-sectional area was treated with two solutions of polyethylene glycol/silicone rubber containing 30% and 40% of polyethylene glycol respectively, the application of the coating solution to the surface of the polysulfone support being effected at atmospheric pressure. The coated supports were again cured at a temperature of 82° C. for a period of 30 minutes.

EXAMPLE IV

To illustrate the applicability and effectiveness of the membranes which have been prepared according to the process of the present invention in contrast to other membranes which may be utilized in a gas separation process, a series of gas separations was effected in which a feed stream comprising a 30/70 mixture of $CO_2/CH_4$ was passed through the membrane at a temperature of about 25° C. and a pressure of about 50 psig across the membrane. The various membranes which were employed are those which were labeled "A" and "B" as set forth in Example II above, while membrane "C" was the one prepared according to the process of the present invention as exemplified by Example I above. As was noted from the above examples, the membranes comprised a polysulfone support which was coated with either silicone rubber or a mixture of silicone rubber and polyethylene glycol which was present in admixture with the silicone rubber in varying percentages. To reiterate, membranes "A" and "B" were prepared by coating the polysulfone at atmospheric pressure while membrane "C" was coated using a pressure in the range of from about 10 to 25 mm of mercury. In the Table the separation factor with regard to the $CO_2$ and methane may be defined by the formula:

$$\alpha A/B = \frac{(C_A/C_B)P}{(C_A/C_B)R}$$

where $(C_A/C_B)$ P equals the concentration of component A divided by concentration of component B in the permeate phase, that is, the phase emanating from the downstream phase of the membrane and $(C_A/C_B)$ R equals the concentration of component A divided by the concentration of component B in the retentate phase, that is, at the upstream phase of the membrane. In this formula, the higher the separation factor, the better the separation of the two gases is achieved.

TABLE 1

| % of Polyethylene Glycol with respect to silicone rubber | $\alpha CO_2/CH_4$ | | | | | | |
|---|---|---|---|---|---|---|---|
| | 0 | 5 | 10 | 20 | 30 | 40 | 50 |
| A | 4.5 | | | | 19.6 | 21.0 | |
| B | 4.1 | | | | 6.4 | 7.2 | |

TABLE 1-continued

| % of Polyethylene Glycol with respect to silicone rubber | $\alpha CO_2/CH_4$ | | | | | | |
|---|---|---|---|---|---|---|---|
| | 0 | 5 | 10 | 20 | 30 | 40 | 50 |
| C | 4.3 | 5.3 | 16.5 | 21.3 | 22.9 | 23.8 | 19.3 |

It will be noted from the above Table that the membrane which was coated with a mixture of polyethylene glycol and silicone rubber, said coating being effected at subatmospheric pressure which ranged from about 10 to 25 mm of mercury, exhibits excellent separation factors when utilizing a 10 to 50% by weight of polyethylene glycol with respect to silicone rubber. It is also noted from the above Table that membrane A which possessed relatively small pore diameters as recognized by the relatively high ratio of 30:1 total surface area to total pore cross-sectional area exhibited relatively good separation factors when coated with 30 to 40% of polyethylene glycol with respect to silicone rubber. However, the disadvantage which is inherent with the use of such a tight membrane was reflected in the flux of said membrane. This membrane had a $(\overline{P}/S)_{CO_2}$ of about $$5 \times 10^{-6} \frac{ml(STP)}{sec \cdot cm^2 \cdot cm(Hg)}$$

which is in contrast to the flux of the relatively loose membrane which is coated in accordance with the present invention, the latter having a $(\overline{P}/S)_{CO_2}$ of about $$16 \times 10^{-6} \frac{ml(STP)}{sec \cdot cm^2 \cdot cm(Hg)}.$$

We claim as our invention:

1. A process for the preparation of a gas selective membrane which comprises the steps of:
   (a) providing a porous supporting membrane comprised of a first organic polymer having opposing first and second surfaces, said membrane possessing a total surface area to total pore cross-sectional area of from about 5:1 to about 800:1;
   (b) providing an emulsion or solution of a second polymer comprising silicone rubber dissolved in a suitable solvent and a glycol plasticizer for said first and second organic polymers having a molecular weight of from about 200 to about 600, said plasticizer being present in said emulsion or solution in an amount of from about 10 wt% to about 50 wt%;
   (c) coating said porous supporting membrane with said emulsion or solution by application of said emulsion or solution to the first surface of said membrane, said opposing second surface of said membrane being under reduced pressure in comparison to the pressure applied to said first surface to enhance the penetration of said emulsion or solution into said membrane upon contact with said first surface;
   (d) curing the resultant coated supporting membrane at an elevated temperature for a period of time sufficient to evaporate substantially all of said solvent; and
   (e) recovering the thus-produced cured gas selective membrane.

2. The process as set forth in claim 1 in which said subatmospheric pressure in step (c) is in a range of from about 1 to about 25 mm of mercury.

3. The process as set forth in claim 1 in which said coating in step (c) is effected for a period of time in the range of from about 10 seconds to about 5 minutes.

4. The process as set forth in claim 1 in which said plasticizer and said second organic polymer are present in said emulsion or solution in a weight ratio in the range of from about 0.05:1 to about 1:1 wt.% of plasticizer per wt.% of polymer.

5. The process as set forth in claim 1 in which said solvent comprises a fluorinated hydrocarbon which is liquid at standard temperature and pressure.

6. The process as set forth in claim 1 in which said emulsion or solution is degassed prior to coating said porous supporting membrane by ultrasonic means.

7. The process as set forth in claim 1 in which said first organic polymer comprises polysulfone.

8. The process as set forth in claim 1 in which said organic polymer comprises cellulose acetate.

9. The process as set forth in claim 1 wherein the coated supporting membrane is cured at a temperature in the range of from about 30° to 150° C.

10. The process as set forth in claim 1 wherein the coated supporting membrane is cured for a period of time of from about 10 minutes to about 1.5 hours.

11. The process as set forth in claim 1 wherein said reduced pressure is in the range of from about 10 to about 25 mm of mercury.

12. The process as set forth in claim 1 wherein said second organic polymer comprises silicone rubber, said first organic polymer is selected from the group consisting of polysulfone and cellulose acetate, and said plasticizer comprises polyethylene glycol.

13. The process as set forth in claim 12 wherein said first organic polymer is polysulfone.

* * * * *